July 8, 1958
T. C. COALE ET AL
2,841,889
PROJECTABLE SLIDE RULE
Filed April 4, 1955
2 Sheets-Sheet 1
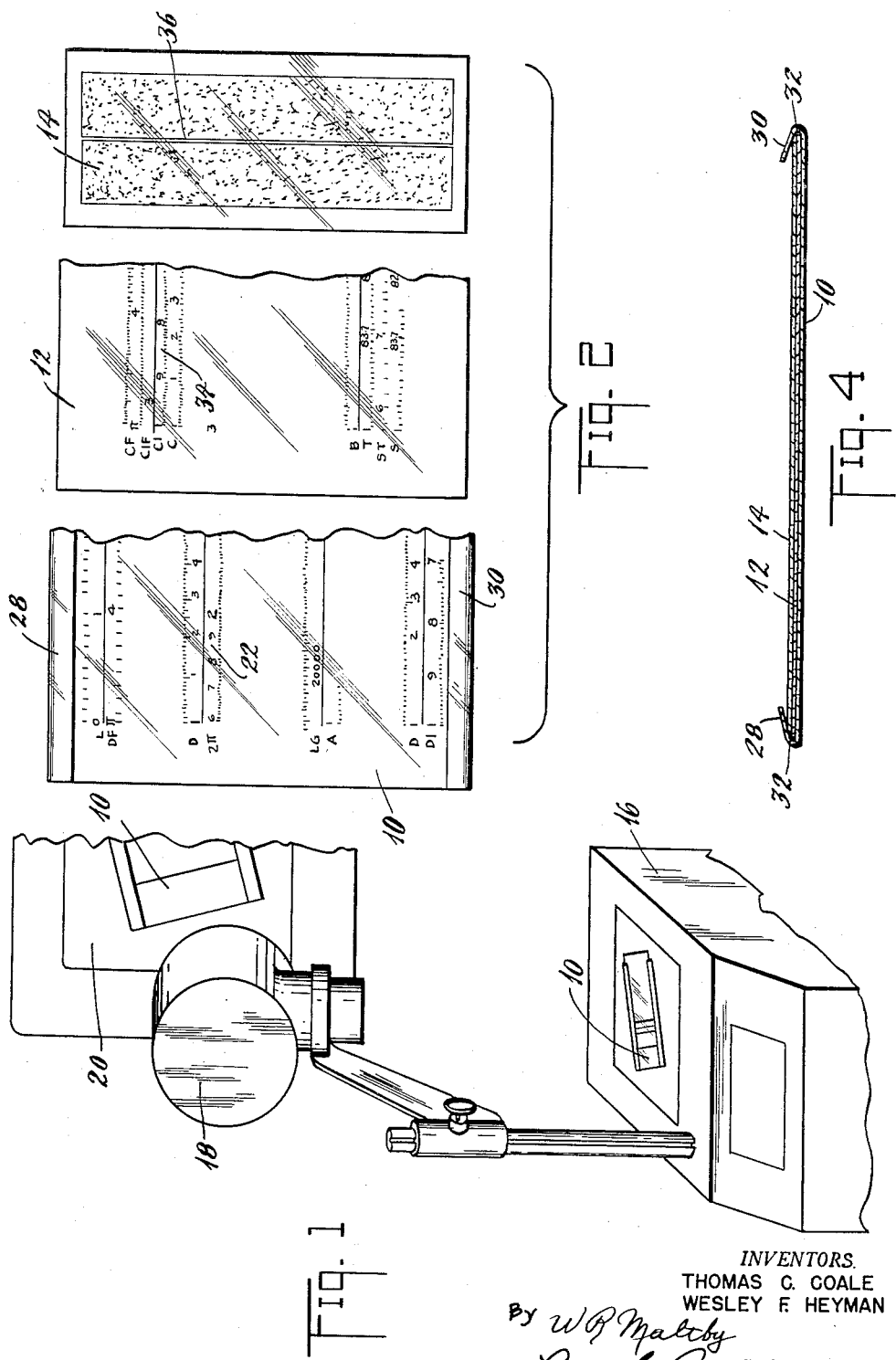
INVENTORS.
THOMAS C. COALE
WESLEY F. HEYMAN
BY W. P. Maltby
Louis B. Applebaum
ATTORNEYS

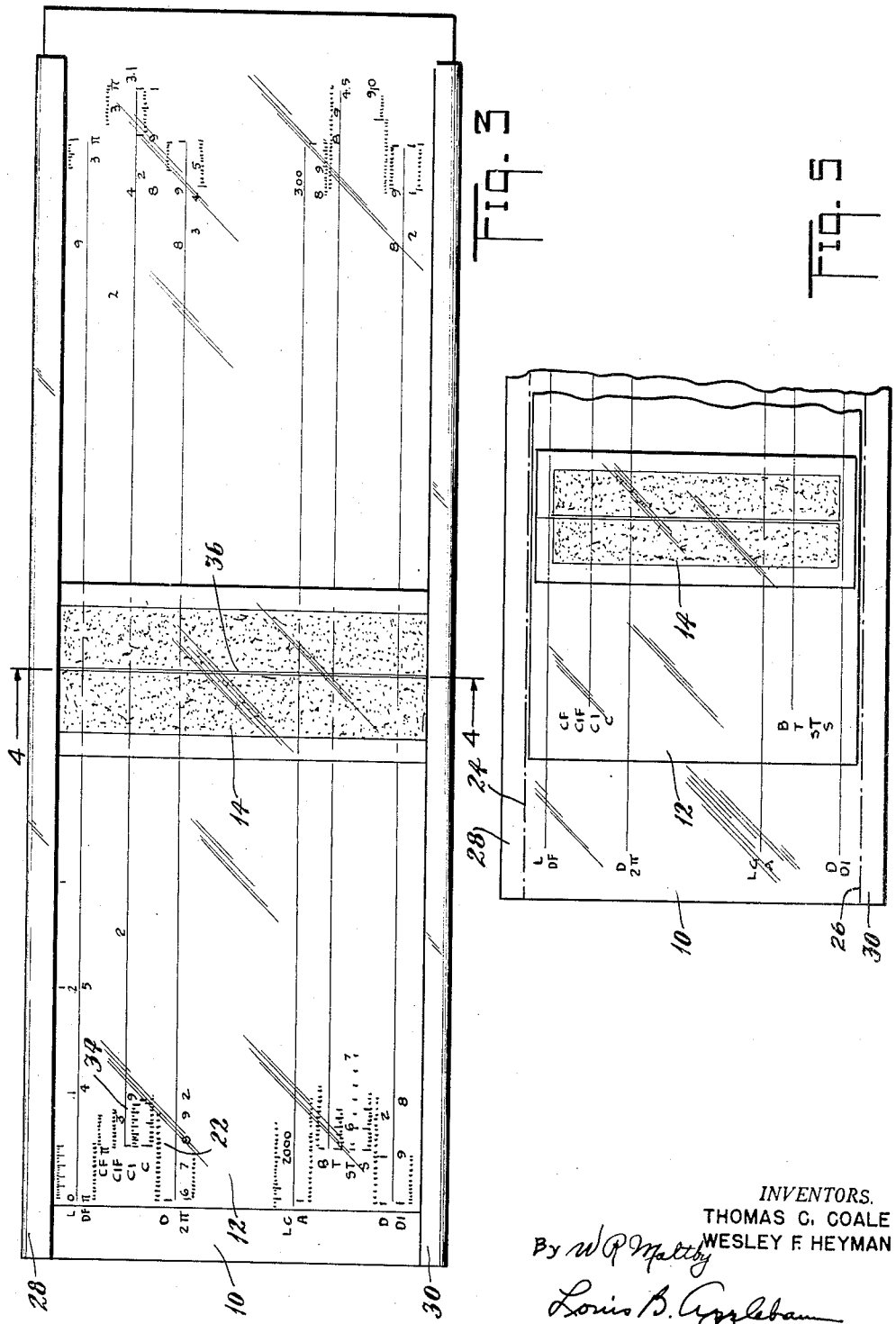

2,841,889

PROJECTABLE SLIDE RULE

Thomas C. Coale, Levittown, and Wesley F. Heyman, Glen Cove, N. Y.

Application April 4, 1955, Serial No. 499,255

5 Claims. (Cl. 35—39)

(Granted under Title 35, U. S. Code (1952), sec. 266)

The invention described herein may be manufactured and used by or for the Government of the United States of America for governmental purposes without the payment of any royalties thereon or therefor.

This invention relates to a device for training large groups of students at one time by overhead projection of the transparent device.

Where mass instruction is necessary, it is always difficult to teach a large group efficiently. This is particularly true where the instruction includes manipulation of relatively small devices. Many methods have been attempted to minimize this difficulty. One such method requires the reproduction, on a greatly enlarged scale, of the structure to be studied. When this method is applied to instruction in the use of the slide rule, an expensive and cumbersome unit is obtained. It is difficult for the instructor to manipulate.

The inadequacies of existing training means is overcome by the instant invention. A completely transparent slide rule containing photographically reproduced scales of the logarithms and antilogarithms normally found on the front and reverse side of a conventional slide rule is projected in magnified form on a screen. Thus the equivalent of an enlarged slide rule is obtained, without being accompanied by an increase in actual size.

The primary object of the invention is to provide a training device that is capable of use in large classrooms.

Another object of the invention is to provide a transparent plastic slide rule for projection of its image on a screen.

Another object of the invention is to provide an inexpensive reproduction of a slide rule capable of being used to train an entire class as one time.

Other objects and many of the attendant advantages of this invention will be readily appreciated as the same becomes better understood by reference to the following detailed description when considered in connection with the accompanying drawings wherein:

Fig. 1 is an elevation of a portion of the overhead projector and screen used with the slide rule of the invention;

Fig. 2 is an exploded view of the transparent slide rule of the invention;

Fig. 3 is an elevation of the slide rule of the invention;

Fig. 4 is a section taken on line 4—4 of Fig. 3, illustrating in exaggerated detail the slide rule components; and Fig. 5 is an elevation of the slide rule showing the slide rule before it is folded over.

The slide rule of the invention is made of transparent plastic material and comprises base 10, medial slide 12 and cursor or slide 14. The slide rule is adapted to be retained on support 16 of projector 18. Illumination from below support 16 permits a magnified image of the slide rule to be projected on screen 20.

Slide rule base 10 is transparent and may be made of any suitable material. The mathematical information 22, normally contained on a slide rule, is photographically reproduced on base 10 for enlarged projection. Score lines 24 and 26, spaced a short distance below the longitudinal edges of base 10, constitute the fold lines along which end flaps 28 and 30 are folded. Flaps 28 and 30, together with base 10 form grooves or tracks 32 to slidably retain slide 12 and cursor 14.

Median slide 12 contains the logarithmic information 34 found on the front and reverse sides of a slide rule. Cursor 14 includes hair line 36, also similar to a conventional slide rule. While cursor 14 comprises an elongated strip of clear plastic material for ease in movement in grooves 32, it is obvious that it may be considerably shortened and still operate effectively.

When the device is to be used, it is initially folded along lines 24, 26, allowing flaps 28, 30 to form a track with base 10. Slide 12 and cursor 14 are then inserted for sliding movement. The slide rule is placed on support 16, which is then illuminated from beneath. The image is transferred to screen 20, on an enlarged scale, by means of projector 18. Since both the front and reverse sides of the conventional slide rule have been reproduced on the transparent material, the entire rule is contained in one unit. Where only one portion is being used for instruction, the other portion may be masked, if so desired. The instructor now has an enlarged projection of a small, and inexpensively produced slide rule. The entire class may be taught the use of the slide rule at the same time, without requiring the handling of cumbersome reproductions of an enlarged model of the slide rule.

Obviously many modifications and variations of the present invention are possible in the light of the above teachings. It is therefore to be understood that within the scope of the appended claims the invention may be practiced otherwise than as specifically described.

What we claim is:

1. A slide rule demonstrator for an overhead projector comprising a transparent planar base, end flaps extending from said base, fold lines between said base and end flaps whereby said flaps are folded along said fold lines to provide track means on the base, said flaps being at an acute angle to the base, a transparent median planar slide movably held in said track means and a transparent cursor superimposed on said slide for movement relative thereto.

2. A slide rule demonstrator for an overhead projector comprising a transparent planar base, end flaps extending from said base, fold lines between said base and end flaps whereby said flaps are folded along said fold lines to provide track means on the base, said flaps being at an acute angle to the base, a transparent median planar slide movably held in said track means, and a transparent cursor superimposed on said slide for movement relative thereto, said cursor being retained within said track means and including a vertical hair line to assist in the reading of the slide rule.

3. A training slide rule comprising an elongated transparent planar sheet, score lines spaced from the longitudinal edges of said sheet, whereby the sheet is folded along the score lines to provide track means, said flaps being at an acute angle to the base, logarithm indicia on said transparent sheet, a transparent planar slide overlying said transparent sheet adjustably received in said track, said slide having indicia thereon, and a transparent cursor slidable in said track and overlying said slide, said cursor having a guide line thereon.

4. A slide rule demonstrator comprising an overhead projector having a base support, a transparent slide rule demonstrator retained on said base support said transparent slide rule demonstrator including a transparent planar base and a transparent planar slide overlying said base, means to illuminate said slide rule demonstrator and a screen aligned with said projector, whereby the image of said slide rule is projected on said screen in magnified form for mass class instruction.

5. A slide rule demonstrator for an overhead projector comprising a thin transparent base, said base having two opposing ends folded over to form an acute angle with the base thus providing a track, slide rule indicia on the upper face of said base, a thin median planar slide movably held in said track, slide rule indicia on the upper face of said planar slide, and a thin transparent slide having a cursor fixed thereon, said cursor slide being also movably held in said track.

References Cited in the file of this patent

UNITED STATES PATENTS

| | | |
|---|---|---|
| 535,375 | Hill | Mar. 12, 1895 |
| 1,431,409 | Miller | Oct. 10, 1922 |
| 1,554,931 | Webber | Sept. 22, 1925 |
| 1,579,880 | Meissner et al. | Apr. 6, 1926 |
| 1,875,927 | Keuffel | Sept. 6, 1932 |
| 2,073,421 | Komorous | Mar. 9, 1937 |
| 2,173,459 | Van Doormaal | Sept. 19, 1939 |

FOREIGN PATENTS

| | | |
|---|---|---|
| 817,011 | France | May 15, 1937 |
| 627,514 | Great Britain | Aug. 10, 1949 |
| 719,080 | Great Britain | Nov. 24, 1954 |